US008086699B2

(12) United States Patent
Christopher

(10) Patent No.: US 8,086,699 B2
(45) Date of Patent: Dec. 27, 2011

(54) LOCAL DIRECTORY NETWORK

(76) Inventor: David L. Christopher, Carlsbad, CA (US)

( * ) Notice: Subject to any disclaimer, the term of this patent is extended or adjusted under 35 U.S.C. 154(b) by 204 days.

(21) Appl. No.: 11/830,707

(22) Filed: Jul. 30, 2007

(65) Prior Publication Data

US 2008/0028039 A1    Jan. 31, 2008

Related U.S. Application Data

(60) Provisional application No. 60/834,139, filed on Jul. 28, 2006.

(51) Int. Cl.
*G06F 15/16* (2006.01)
(52) U.S. Cl. .................. 709/218; 709/219; 709/249
(58) Field of Classification Search .................. 709/218, 709/219, 249
See application file for complete search history.

(56) References Cited

U.S. PATENT DOCUMENTS

| | | | | |
|---|---|---|---|---|
| 5,491,817 | A * | 2/1996 | Gopal et al. | 707/770 |
| 6,505,238 | B1 * | 1/2003 | Tran | 709/208 |
| 6,968,513 | B1 * | 11/2005 | Rinebold et al. | 715/854 |
| 2002/0062277 | A1 * | 5/2002 | Foster et al. | 705/38 |
| 2003/0061060 | A1 * | 3/2003 | Tenorio | 705/1 |
| 2005/0091220 | A1 * | 4/2005 | Klemow | 707/10 |
| 2006/0004623 | A1 * | 1/2006 | Jasti | 705/10 |
| 2006/0224445 | A1 * | 10/2006 | Axe et al. | 705/14 |

* cited by examiner

*Primary Examiner* — Mohamed Wasel

(57) ABSTRACT

A strategy for developing an internet-based network of directory-style websites, where each site operates independently as a fully-developed portal for its local online community and concurrently functions as a portal for the network as a whole, providing access to the other directory-style websites on the network. Various potential configurations are presented. The method eliminates the need for a central portal website, while transforming each URL on the network into a directory-style website with high value content and links. One configuration combines locality with profession to establish a network of locally-based, directory-style websites, each with its own community of local professional therapists: effectively establishing an online network community-based therapists using interconnected but functionally separate URLs. In this networked example of directory-style websites, the therapists utilize the public's access of each URL as a means to communicate with and educate their local geographic community about relevant counseling and therapeutic concerns. The result is that each website benefits from the content, links, and the various types of interactions the therapists provide to their potential users. Their work maintains the growth of the website, potentially enhancing the search rankings for each website in the network. Concurrently, since each URL operates separately but is part of the network of therapist websites, each site can benefit from sharing content, establishing two-way links, and referrals. This synergy should enhance the search engine rankings for each website in the network. Other configurations are discussed and presented. The concept of a link and referral management system for this specific online environment is explored.

7 Claims, 4 Drawing Sheets

LOCAL DIRECTORY NETWORK

CROSS-REFERENCE TO RELATED APPLICATIONS

This application claims priority under U.S.C. §119(e) to U.S. Provisional Patent Application Ser. No. 60/834,139 filed Jul. 28, 2006, the disclosure of which is incorporated by reference herein in its entirety.

BACKGROUND OF THE INVENTION

1. Field of the Invention

This application relates to local directory networks. In particular, this application relates to a referral system which utilizes a directory of related web sites to provide more effective localized search for professional services.

2. Description of the Related Art

In offering professional services, it is typically desirable to provide excellent referrals for clients. For example, a client of a family therapist may ask the family therapist whether they know a good accountant. While client needs vary both geographically and professionally, the desire for a high level of expertise in the referral sources is consistent. Regardless of the need for legal advice, financial consulting, counseling, psychiatric assistance, medical opinion, or suggestions from a realtor, nearly everyone prefers the guidance of an expert and one who is familiar with the local area.

As the Internet has matured, its use has become an everyday part of many people's lives. Despite the worldwide reach of the Internet, the need for local access to information remains. Virtually every form of information is available via the Internet today. Indeed, dependence on information accessibility is growing at a remarkable pace. A short while ago people turned to friends, the newspaper, or the yellow pages for referrals or quick information. Today, most people will quickly attempt to search the Internet or "Google it". Currently, due to the vast amount of information available through search engines and web-based directories, it is difficult to target Internet searches to a specific locality. As a result, there is a need for geographically-based expert referrals of professionals that are easily accessible through the Internet.

SUMMARY OF THE INVENTION

The systems and methods of the present invention each have several aspects, no single one of which is solely responsible for its desirable attributes. Without limiting the scope of this invention, several of its features will now be discussed briefly.

In one embodiment, a method for creating a network of websites is provided. The method includes creating a portal website having a domain name indicative of a service; creating a plurality of local websites having a domain name indicative of the service and a locality, wherein the each of the plurality of local websites ha indicative of a locality; providing a plurality of links, which, when selected, sends a user from the portal website to one of the plurality of local websites; receiving content related to the local websites from providers of the service in the locality, the content including at least one link; scanning the content on the local websites to retrieve the at least one link provided therein; adding the link to a link library; determining that the link is appropriate for distribution to additional local websites; and distributing the link to the additional local websites.

In another embodiment a hierarchy of websites is created in a network. The hierarchy may include a first level having at least one website. Each website may have a domain name indicative of a professional service. The hierarchy may also include a second level. The second level may include at least one website having a domain name indicative of a geographical location and the professional service. The hierarchy may also include a third level having at least one website. Each third level website may offer the professional service related to the first and second level websites. The method further includes providing links on the second level website which, when selected, send a user from the second level website to the third level website. The third level website is scanned to retrieve selected links provided therein. The retrieved links are then selectively copied to the first and the second level websites.

In some embodiments, the hierarchy of websites may further include a fourth level. The fourth level may have at least one informational website providing information related to the professional service. The retrieved links may also be copied to the fourth level website. In certain embodiments, the retrieved links may be stored in a link library. In addition, the third level website may be periodically rescanned to determine whether new links have been added to the website. If there are new links provided therein, the new links may be stored in the link library. In some embodiments, prior to storing the links in the link library, the links may be reviewed to ensure they are appropriate to store in the link library.

Another aspect of the invention is a professional referral system. The system may include a first website, a second website, and a third website. The first website may be related to a professional service and configured to provide links to the second website. The second website may be related to both the professional service and a geographic location. The third website may be related to professional services offered by one or more specific service providers. The system may further include a link library configured to store location identifiers. The location identifiers may be URLs, and may be collected from web pages of the third website by a link-collecting engine. The link-collecting engine may be configured to scan the third website and store the links in the link library. The link-collecting engine may be a web crawler. Any and all websites may have paid advertisements for (1) experts, (2) related goods/services, (3) or general goods/services. For instance, a therapist website could display drug advertisements. The system may also include a link distribution module configured to retrieve the links from a link library and add the stored links to the content of the first website and the second website.

In still another embodiment, a computer-assisted method is provided for creating a network of websites providing geographically-targeted content. In one embodiment of the invention, there exists two levels. The first level comprises a portal. This portal represents the hub of the network, responsible for collecting, storing, and distributing content among the sites of second level. The second level comprises a plurality of websites, each website being a truly local site, with at least some content specific to a locality. In one embodiment, each website of the second level is associated with a service and a locality.

DETAILED DESCRIPTION OF THE PREFERRED EMBODIMENT

Various embodiments described herein provide a system and method for creating a network of websites which provides a series of websites targeted to a service and a locality. The network of websites are configured to share relevant content and to automatically generate internal links to optimize their positioning in search engine rankings. A portal website may provide links to the locality websites, allowing user to locate a specific service provider located in a specific area.

Figure 1:
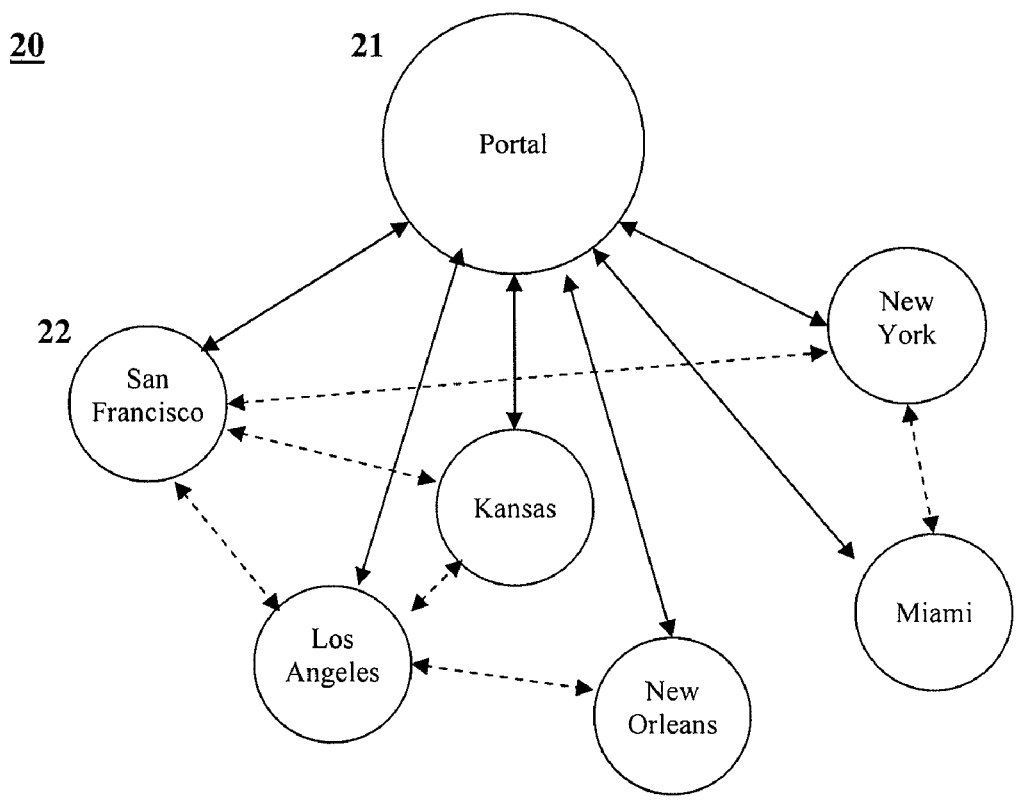
FIG. 1 is network of websites providing local services.

FIG. 1 provides an example of a local network of websites according to one or more embodiments. The local network includes two levels of websites. The first level is a portal site 21. The portal site 21 may be a website with a domain name indicative of a service. For example, the portal site might have the URL of www.FindLocalTherapists.com. The second level comprises a plurality of local sites 22. The local sites may have a domain name indicative of a service and a locality. Examples of the URL of a local site include SanDiegoTherapists.com, VetsofNewEngland.com, and BostonCaterers.com. The local sites 22 may be locally-owned or locally-managed, by owners and/or managers located in the locality represented in the domain name. The local sites may have content specific to the profession and locality representing in the domain name. For example, in the case of a therapist website, a particular locality may experience a traumatic event. The local therapist website may provide content specific to dealing with that traumatic event.

The portal site may contain links to the local sites, and vice versa. The local sites may contain links to other local sites. The local sites may contain links to other sites, outside of the local directory network. In some embodiments, these links are organized by the portal site to effectively share relevant content among the different local websites.

Figure 2:
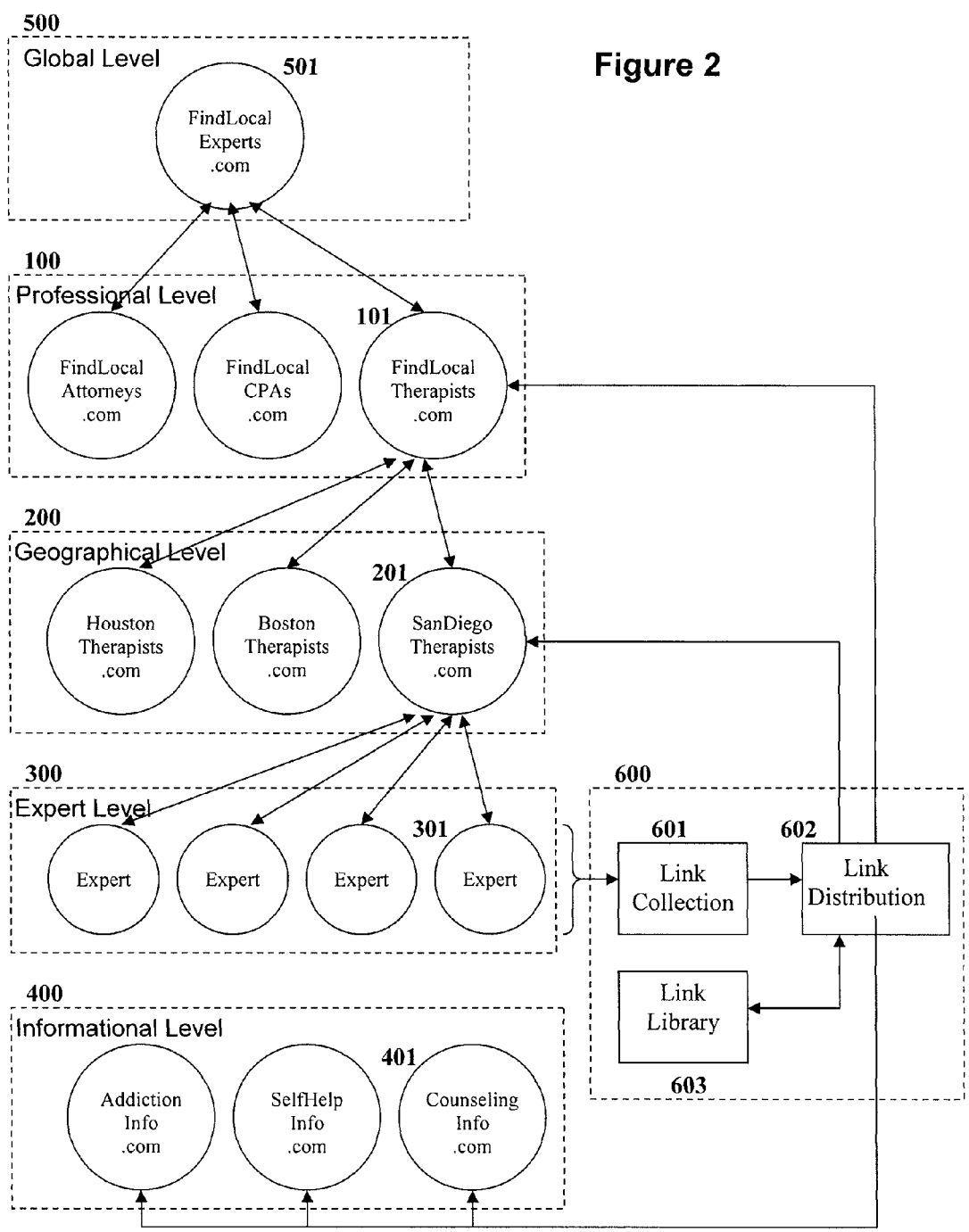
FIG. 2 is a network of websites providing geographically-targeted expert referrals.

FIG. 2 is an example of a more complex local directory network of websites. In this embodiment a local directory network of websites includes a plurality of levels. In this particular example, there are three such levels, labeled in FIG. 2 as the professional level 100, the geographical level 200, and the expert level 300. The levels may be organized hierarchically or linearly. The websites in the professional level 100 may function as a portal site 21, while the geographical level 200 websites 201 may function as local sites 22.

The professional level 100 contains a plurality of professional websites 101. The URL of each of the plurality of professional websites 101 references a profession. For example, the URL of a professional website 101 may be FindLocalAttorneys.com, FindLocalCPAs.com, or FindLocalTherapists.com. Each of the professional websites 101 in the professional level 100 may share a characteristic feature. Other examples of professional website 101 URLs include GreatTherapist.com, MyDoctor.com, and Discount-Plumbers.com. URLs may include hyphens. URLs may include the profession in singular or plural form. URLs may include the profession in abbreviated form. URLs may include the .com top-level domain, or any of a number of other top-level domains, including but not limited to info, net, pro, or org. In an embodiment, each professional website 101 contains a plurality of links, each link associated with a geographical website 201.

The geographical level 200 contains a plurality of geographical websites 201. The URL of each of the plurality of geographical websites 201 references both the profession of the parent professional website 101 and a geographical location. For example, the URL of a geographical website 201 may be SanDiegoTherapists.com, HoustonTherapists.com, or BostonTherapists.com. Each of the geographical websites 201 corresponding to a parent professional website 101 may share a characteristic feature or formatting. It is within the scope of the invention to have geographical websites 201 with the URLs SanDiegoVets.com, NewEnglandVeternarian.com, and VetsofSouthFlorida.com. Geographic location may refer to a city, county, zip code, or general area. In an embodiment, each geographical website 201 contains a plurality of links, each link associated with an expert website 301. The expert level 300 contains a plurality of expert websites 301. Each of the expert websites 301 offers a professional service related to the profession of the parent professional website 101 and near the geographic location of the parent geographical website 201. The expert websites 301 may link to other websites.

Also included in the local directory network of FIG. 2 is a content management system. The portal site would be responsible for collecting, storing, and distributing content. The content management functionality may be provided by link management node 600. The link management node 600 comprises a link collector 601, a link distribution center 602, and a link library 603. The link collector 601 periodically scans the local websites 22 for links to other websites. The collection of links is provided to the link distribution center 602 which is responsible for placing new and valid links into a number of web pages, including the portal website 21 and local websites 22.

The link distribution center 602 establishes which of the links are new by comparing them with a collection of links stored in a link library 603. When a link is identified as new, it is added to the link library 603. Additionally, the link distribution center 602 establishes which of the links are valid. If a link is invalid, it may be removed from the link library 603. The link distribution center 602 is also responsible for determining whether or not a link is appropriate for addition to the portal website 21 and other local sites 22. For example, if a link is added to a geographic level website 201 that links to an article concerning rising healthcare costs in California, the link distribution center 602 might add that link to the local sites 22 corresponding to the locality of Los Angeles, San Diego, San Francisco, but not to local sites 22 corresponding to localities outside of California.

FIG. 2 also includes a a fourth level of hierarchy—informational level 400. The fourth level may contain a plurality of informational websites 401. The link distribution center 602 might add new and valid links to the informational websites 401. The informational websites 401 may have information related to a professional service. Accordingly, the professional website 101 (or portal 21) associated with that service might provide a link to the informational website 401. Each professional website 101 might link to a plurality of informational websites 401. FIG. 2 also provides a fifth level of hierarchy. This fifth level, labeled the global level 500 may include a global website 501 having a URL indicative of the availability of geographically-targeted expert referrals at the website.

Through the accumulation of multiple local sites that act as potential portals into the Internet user's world, the network becomes a powerful system for providing access to locally-based services to users. As FIG. 2 depicts, each geographical website 201 may be designed to provide experts for a specific profession (such as therapists in the FindLocalTherapists.com sub-network). The resultant accumulation of websites and content added to each geographical website 201 strengthens their power and reach. This is collectively focused at the local level (such as SanDiegoTherapists.com) with all geographical websites 201, each expert website 301, and their info/content/links and overall strength adding to the parent sites. Thus, the system provides the unique ability to provide hundreds of interlocking localized sites with specific experts, referrals, and focused content. Rather than using a database to merely digitally represent each professional, the embodiments described herein provide a system and method that allow for actual integration of websites, URLs, and links.

Each of the expert websites 301 may includes links to other websites. These links to other websites may link to articles written by the expert themselves. As each new expert website 301 is added to the system, the system provide associated with the expert website 301 may be asked to contribute articles related to their area of expertise, and to provide links to these articles on the expert website 301. These articles may include content that allows persons reading them to develop a sense of the service provider's work, experience, and expertise. As additional articles are provided and linked to, the link management node 600 will add these links where appropriate. Through the act of adding these links, their visibility may increase in search engine 912 rankings. Search engine 912 rankings may also be affected by the URLs of the websites in the network. The URL strings (domain names) of the websites in the network may be specifically chosen to optimize ranking of the website by a search engine 912.

A couple of exemplary searches are described. Someone searching for an accountant might search "how to find a local accountant". The results would include, perhaps prominently, "FindLocalAccountants.com." The user would then select this link, and be directed to a professional website 101. From there, links would direct them to the geographic website 201 related to the location of the desired accountant. From there, links would direct them to expert websites 301 of experts providing the service they desire in a desirable location, A person searching for a therapist in San Diego may search for either "San Diego Therapist" or "92101 Therapist". The search results would include, perhaps prominently, "SanDiegoTherapist.com". The user would then select this link and be directed to the geographic website 201 related to San Diego and the profession of therapist. From there, as above, links would direct them to expert websites 301 of experts providing them service they desire in a desirable location.

Figure 3:
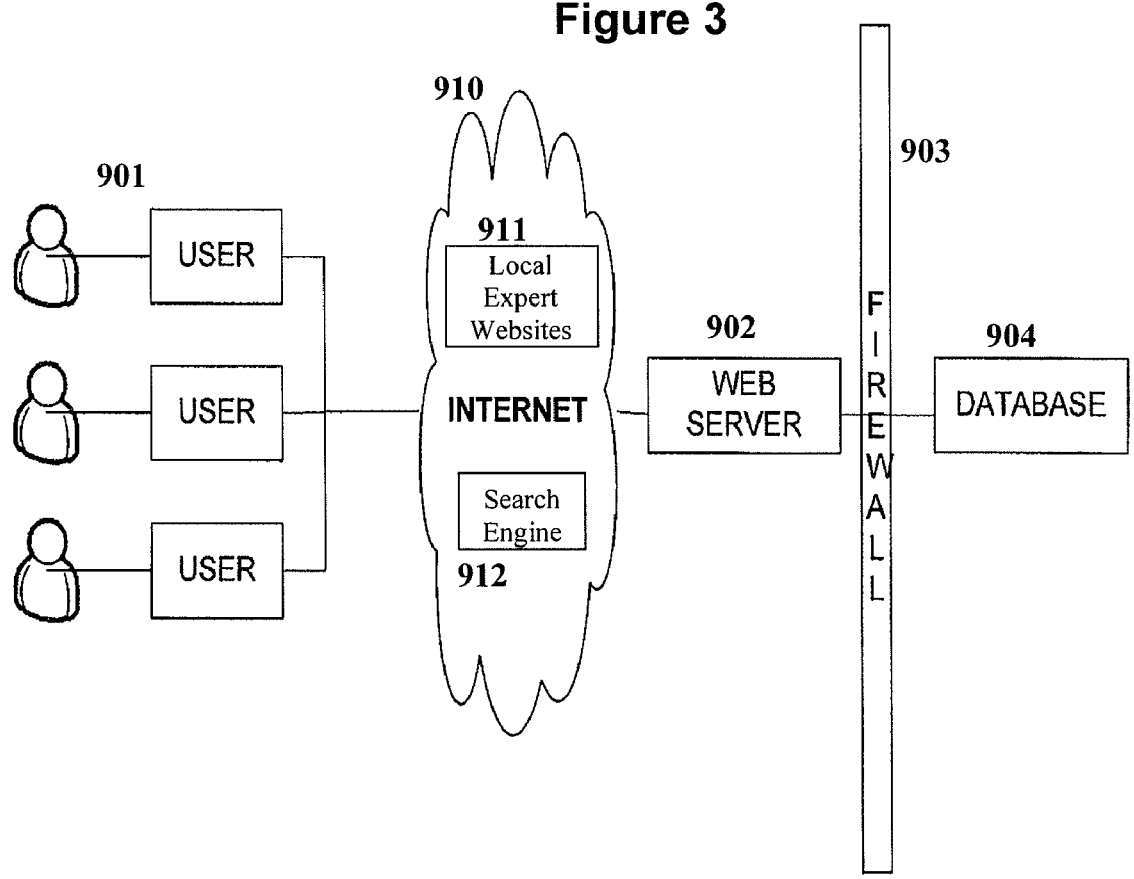
FIG. 3 is a diagram of a general computing environment suitable for the implementation of various embodiments disclosed herein.

The embodiments described herein may be practiced in a general purpose computing environment as shown in FIG. 3. The computing environment may include one or more web servers 902 which may be general purpose computers running web server software such as Apache or IIS, for example. The web server 902 may be in communication with a database 904. The database may reside on a general purpose computing device or a specialized database server. The database server 904 may be placed behind a firewall 903 to protect it from unauthorized access over the Internet 910. Users 901 may utilize Internet capable computing devices to access the web server 902 over the Internet 910. Before accessing the server, users will generally retrieve information from the unstructured data on the web using a search engine 912.

Figure 4:
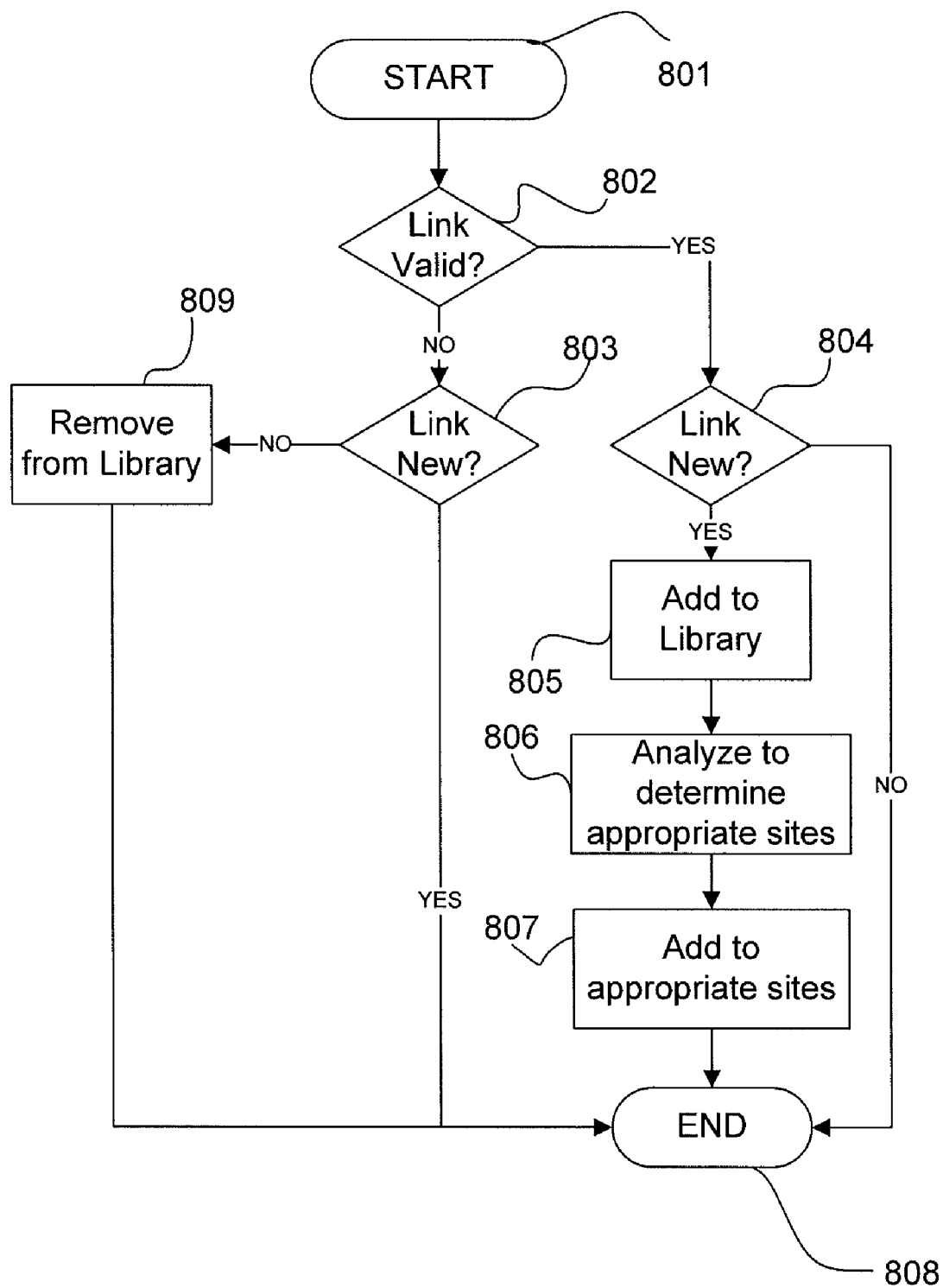
FIG. 4 is a flowchart showing the function of the link distribution center.

FIG. 4 is a flowchart diagramming illustrating how the link distribution center 602 processes links received from the link collector 601. The process initiates at block 801. From there, the process moves to decision block 802, where the link distribution center 602 checks the link for validity. If the link is not valid, the process moves to decision block 803, where the link distribution center 602 determines whether the link is new. If the link is not new (e.g., it exists in the link library), the process moves to block 809 and the link is discarded from the library. If the link is new, the process moves from decision block 803 to termination block 808 because removing it from the library is unnecessary.

Referring back to decision block 802, if the link is valid, processing moves to decision block 804, where the link distribution center 602 determines if the link is new. If it is not new, the process terminates at block 808. If the link is valid and new, the link is added to the library at block 805. Next, the new and valid link is analyzed to determine which of the professional sites 101, geographical sites 201, expert sites 301, informational sites 401, or local sites 22 are appropriate for the link at block 806. The link distribution center 602 then adds the links to these appropriate sites at block 807, and then proceeds to terminate at block 808.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A computer-implemented method for creating a plurality of bi-directionally interconnected network of websites and directory-style website configuration, organized in a plurality of hierarchical configurations, comprising:

creating a directory-based portal website having a domain name indicative of a service, such that each website in the interconnected network of websites can be located more effectively by internet searches than it would be in its non-networked state;

establishing an interconnected network of directory-based websites, wherein each website is represented by a unique URL;

creating a plurality of local directory-based websites having a domain name indicative of a service and a locality;

providing a plurality of links, which, when selected, sends a user from any one of the directory-based websites to another of the plurality of local directory-based websites in the interconnected network;

receiving content related to any of the directory-based websites in the interconnected network from providers of the service in the locality, the content including at least one link;

scanning the content on any of the directory-based websites in the interconnected network to retrieve at least one link provided therein;

adding the at least one link to a link library for all directory-based websites in the interconnected network;

determining that the at least one link is appropriate for distribution to any directory-based website in the interconnected network;

distributing the at least one link to any other directory-based website in the interconnected network; and creating a network that allows any directory-based website in the interconnected network to function as its own portal or a portal to other directory-based website in the interconnected network.

2. The method of claim 1, wherein the local directory-based websites include locally-relevant content.

3. The method of claim 1, wherein the local directory-based websites are either owned, managed, or maintained by a person within the locality indicated in the domain name of the local site.

4. A computer-implemented method for creating a network of directory-based websites providing geographically-targeted community-based local professionals, the method comprising:

creating a hierarchy of directory-based websites, the hierarchy being comprised of a plurality of levels;

creating a hierarchically organized network that allows any directory-based website in the network to function as its own portal or a portal to any other directory-based website in the network;

the hierarchy including a professional level, the professional level including at least one professional directory-based website having a domain name indicative of a professional service;

the hierarchy including a geographical level, the geographical level including at least one geographical directory-based website having a domain name indicative of a geographical location and the professional service;

the hierarchy including an expert level, the expert level including at least one expert directory-based website having a domain name indicative of a geographical location and the professional service;

providing at least one link which, when selected, sends a user from at least one of the professional directory-based websites to at least one of the geographical directory-based websites;

providing at least one link which, when selected, sends a user from one of the least one geographical directory-based websites to one of the at least one expert directory-based websites;

providing at least one link which, when selected, sends a user from one of the least one expert directory-based websites to at least one other directory-based website;

scanning the expert websites to retrieve the at least one link provided therein; and copying at least one of the retrieved at least one link to at least one professional website or geographical website.

5. The method of claim 4, wherein the hierarchy of directory-based websites further includes a global level, the global level having a domain name indicative of the availability of geographically-targeted expert referrals at the website.

6. The method of claim 4, further comprising displaying at least one advertisement on at least one of the directory-based websites.

7. The method of claim 4, wherein at least one of the domain names includes at least one of a hyphen or a number.

* * * * *